United States Patent
Meylemans

(10) Patent No.: US 11,130,774 B1
(45) Date of Patent: Sep. 28, 2021

(54) DIPYRIDYL KETONE COORDINATION COMPLEXES FOR REDUCTION OF CARBON DIOXIDE

(71) Applicant: The United States of America, as represented by the Secretary of the Navy, Arlington, VA (US)

(72) Inventor: Heather A. Meylemans, Camarillo, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 290 days.

(21) Appl. No.: 16/409,950

(22) Filed: May 13, 2019

Related U.S. Application Data

(62) Division of application No. 15/076,187, filed on Mar. 21, 2016, now abandoned.

(60) Provisional application No. 62/135,859, filed on Mar. 20, 2015.

(51) Int. Cl.
| | | |
|---|---|---|
| C25B 3/25 | (2021.01) | |
| C07F 15/06 | (2006.01) | |
| C10L 1/04 | (2006.01) | |
| B01J 19/12 | (2006.01) | |
| C10L 1/02 | (2006.01) | |
| C07F 1/08 | (2006.01) | |
| C25B 11/075 | (2021.01) | |

(52) U.S. Cl.
CPC ............ *C07F 15/065* (2013.01); *B01J 19/127* (2013.01); *C07F 1/08* (2013.01); *C10L 1/02* (2013.01); *C10L 1/04* (2013.01); *C25B 3/25* (2021.01); *C25B 11/075* (2021.01); *C10L 2290/38* (2013.01)

(58) Field of Classification Search
None
See application file for complete search history.

(56) References Cited

PUBLICATIONS

Ziessel et al. (M. Aresta and J. V. Schloss (eds.), NATO ASI Series, Series C: Mathematical and Physical Science, vol. 314, pp. 79-100, (1990). Enzymatic and Model Carboxylation and Reduction Reactions for Carbon Dioxide Utilization, 79-100. 1990 Kluwer Academic Publishers (Year: 1990).*

* cited by examiner

*Primary Examiner* — Yun Qian
(74) *Attorney, Agent, or Firm* — Naval Air Warfare Center Weapons Division; Stuart H. Nissim

(57) ABSTRACT

A series of 2,2'-dipyridyl ketone (DPK) containing metal complexes have been synthesized with metals including Mn, Fe, Co, Ni, Cu, Ru, Pd, and Pt. These complexes have one, two or three DPK ligands chelated to the metal center. In addition to the DPK ligands the complexes can comprise halogen ligands that can easily exchange with carbon dioxide to allow for reduction to small molecules such as methanol or oxalate. Initial electrochemical measurements show a reversible binding of carbon dioxide to the metal catalyst.

11 Claims, 2 Drawing Sheets

DIPYRIDYL KETONE COORDINATION COMPLEXES FOR REDUCTION OF CARBON DIOXIDE

CROSS-REFERENCE TO RELATED APPLICATIONS

This is a divisional, non-provisional application claiming the benefit of parent application Ser. No. 15/076,187 filed on Mar. 21, 2016 which claimed the benefit of parent application Ser. No. 62/135,859 filed on Mar. 20, 2015, whereby the entire disclosure of which is incorporated herein by reference.

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The invention generally relates to an efficient pathway for the sequestering of carbon dioxide and its subsequent conversion into a liquid feedstock for fuel production. A series of carbon dioxide reduction catalysts have been synthesized for conversion of carbon dioxide into liquid feedstocks for fuel.

BACKGROUND OF THE INVENTION

The Intergovernmental Panel on Climate Change (IPCC) report for 2014 reports that Total Global Emissions in 2012 were 6,526 million metric tons of $CO_2$ equivalents. There will be 35 gigatons of carbon emitted into the atmosphere in 2015. By the year 2050 we will need approximately twice as much energy globally as we use now; consequently, China and India alone will produce 50 gigatons of carbon annually.

As the amount of $CO_2$ in the atmosphere has steadily increased over the last few decades, so has the interest in finding a way to reduce it, ideally by converting it into a useable energy source. Specifically, the catalytic reduction of carbon dioxide to liquid fuel is a rapidly growing research area. While inorganic catalysts for use in carbon dioxide reduction are not new, there has yet to be a viable long-lived catalyst that can operate under mild conditions. The main challenge in this area of chemistry arises from the need for a multi-electron process to reduce $CO_2$.

Examples of carbon dioxide reduction reactions:

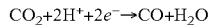
$$CO_2 + 2H^+ + 2e^- \rightarrow CO + H_2O$$

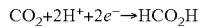
$$CO_2 + 2H^+ + 2e^- \rightarrow HCO_2H$$

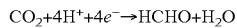
$$CO_2 + 4H^+ + 4e^- \rightarrow HCHO + H_2O$$

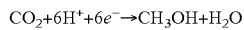
$$CO_2 + 6H^+ + 6e^- \rightarrow CH_3OH + H_2O$$

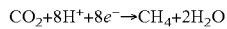
$$CO_2 + 8H^+ + 8e^- \rightarrow CH_4 + 2H_2O$$

Metal complexes containing the 2,2'-dipyridyl ketone (DPK) ligand have previously been synthesized. An example of these syntheses can be found in V. Rattanaphani and W. R. McWhinnie, Inorganica Chimica Acta, 9 (1974) 239-244. Bocarsly and co-workers have published several papers on the use of pyridine as a catalyst for carbon dioxide reduction, see, e.g.: J. Am. Chem. Soc. 132, 11539-11551 (2010).

The current invention encompasses a series of catalysts that address these challenges. These complexes all contain the 2,2'-dipyridyl ketone (DPK) ligand chelated to a metal center. Data indicates the carbon dioxide reduction appears to be ligand dependent and should therefore work with a variety of different metals.

The current invention encompasses a method of synthesizing a long lived catalyst that can efficiently reduce carbon dioxide without additional energy input.

It is to be understood that the foregoing general description and the following detailed description are exemplary and explanatory only and are not to be viewed as being restrictive of the invention, as claimed. Further advantages of this invention will be apparent after a review of the following detailed description of the disclosed embodiments, which are illustrated schematically in the accompanying drawings and in the appended claims.

DETAILED DESCRIPTION OF THE EMBODIMENTS OF THE INVENTION

In an effort toward production of solar fuels the present invention provides catalysts for the process of carbon dioxide ($CO_2$) reduction to a fuel feedstock such as methanol. A series of carbon dioxide reduction catalysts have been synthesized and characterized. These catalysts possess activity toward carbon dioxide and the products generated from the reduction. Such products include, but are not limited to, fuel feedstocks and triazine compounds. Examples of such products include, but are not limited to, CO, $HCO_2H$, HCHO, $CH_3OH$, $CH_4$, 2,4,6-trimethyl-1,3,5-triazine, and various combinations thereof.

Preferred embodiments of the catalysts can be synthetically modified to attach to an electron donor that can donate multiple electrons. For example, photosensitized Reduced Graphene Oxide (RGO) is used as the electron donor in these systems. The donor-acceptor catalyst synthesized is characterized using Raman, IR, XRD, TGA-IR, and multinuclear NMR as well as high-resolution magic angle spinning (HRMAS) NMR in an effort to ensure covalent bonding between the catalyst and the RGO donor. The donor-acceptor composite catalyst has a high efficiency for $CO_2$ reduction. Preferred donor-acceptor complexes can be used in larger systems that can produce renewable fuel feedstocks from $CO_2$ using solar energy.

Figure 1:
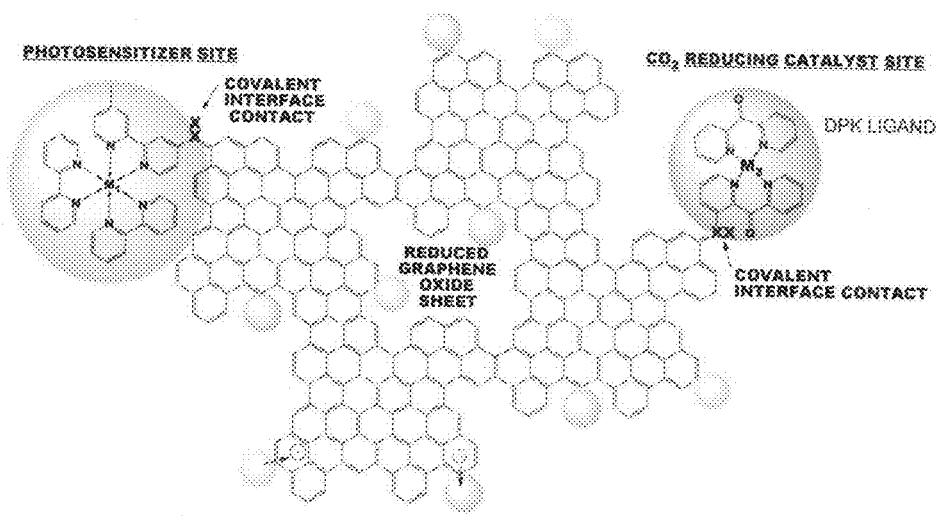
FIG. 1 is an illustration of a donor-acceptor complex system for carbon dioxide reduction using dipyridyl ketone coordination complexes according to embodiments of the invention.
Figure 2:
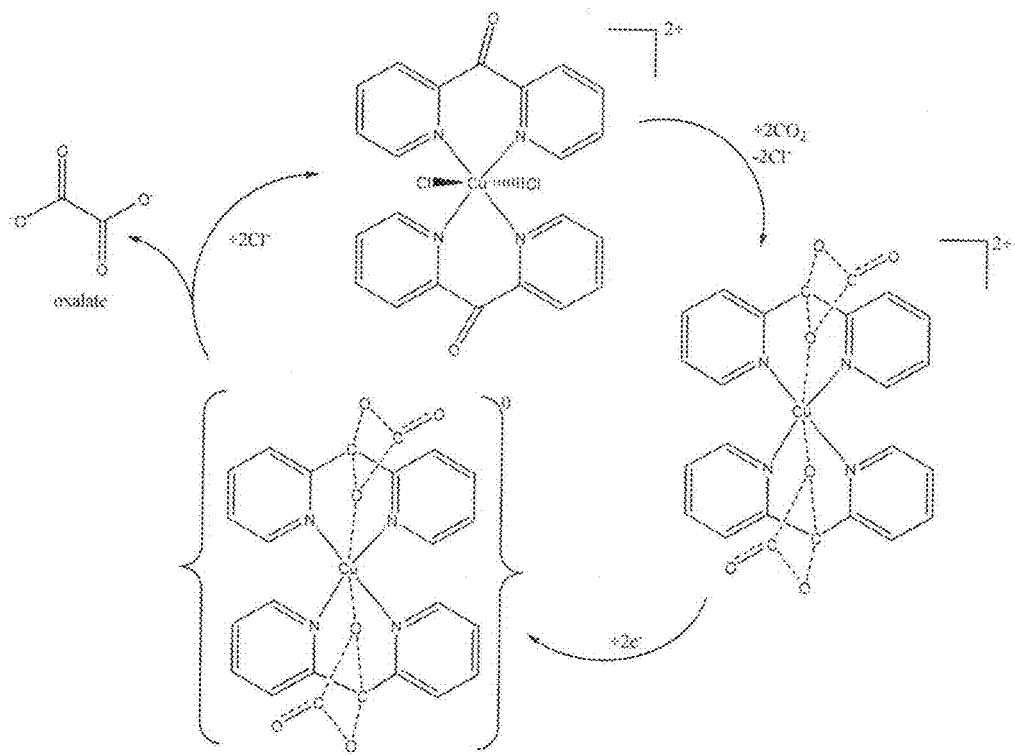
FIG. 2 is a schematic of the reactions of the carbon reduction process using dipyridyl ketone coordination complexes according to embodiments of the invention.

Preferred $CO_2$ reduction catalysts have high efficiencies and long lifetimes and can be produced from inexpensive materials. The $CO_2$ reduction catalysts can be used alone or used in conjunction with electron donors (FIG. 1) that provide the transport medium for a comprehensive self-contained solar fuel production system. (FIG. 2).

Figure 3:
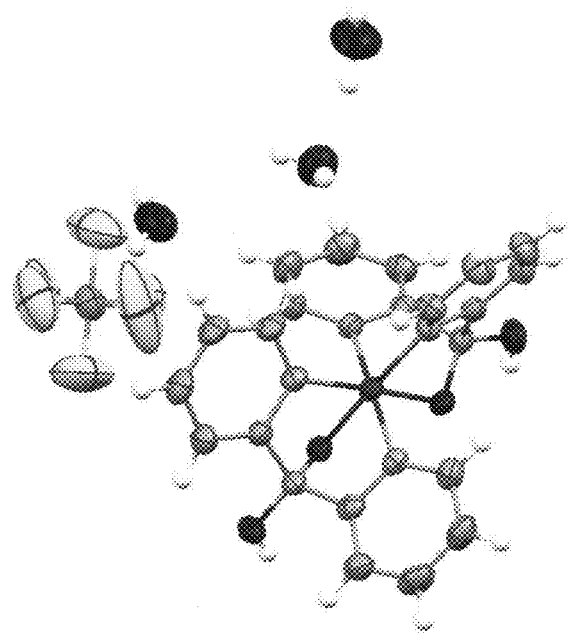
FIG. 3 is an X-Ray crystallography of the carbon reducing dipyridyl ketone coordination complex $Co(DPK)_2(PF_6)$ according to embodiments of the invention.
Figure 4:
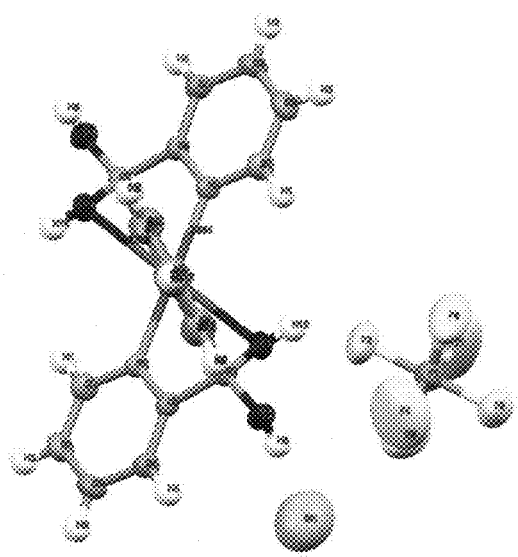
FIG. 4 is an X-Ray crystallography of the carbon reducing dipyridyl ketone coordination complex $Cu(DPK)_2(PF_6)(Cl)$ according to embodiments of the invention.

Preferred $CO_2$ reduction catalysts of the present invention include, but are not limited to, species made from transitions metals; preferably species made from Mn, Fe, Co, Ni, Cu, Ru, Pd, and Pt; more preferably species made from cobalt, nickel, manganese, iron and 2 different oxidation states of copper. Complexes of the present invention have been characterized using X-Ray crystallography, examples are shown in FIGS. 3 and 4. These complexes are distinguishable from other art in that other metal complexes reported in the literature with the DPK ligand tend to form clusters rather than discrete complexes with a single metal center. This could be a factor in the ability of the present complexes to bind $CO_2$.

Preferred embodiments of the catalysts have the formula:

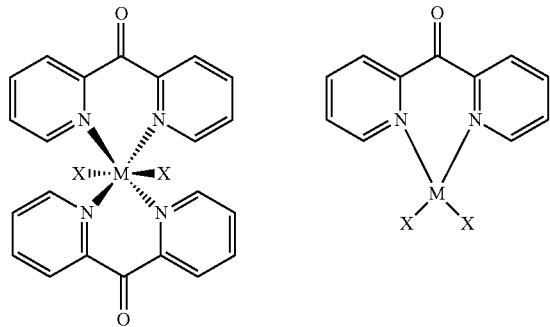

or
where M is a transition metal; and,
X is halogen

The process segment for the carbon dioxide sequestration is illustrated in FIG. 2 and by the formula:

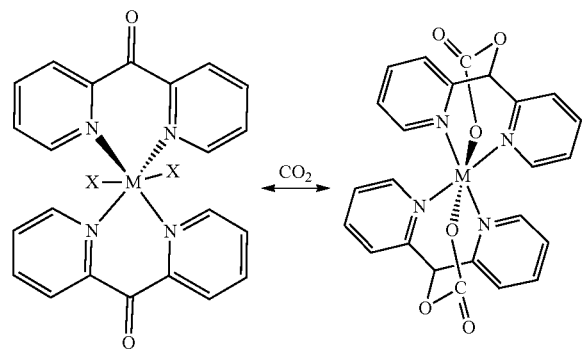

Major advantages of the invention include, but are not limited to, the current $CO_2$ reduction catalysts have high efficiencies and long lifetimes and can be produced from inexpensive materials. Also, the DPK ligands form discrete complexes with a single metal center.

EXAMPLES

A series of catalysts were synthesized using Manganese, Cobalt, Copper and Nickel. The catalysts were characterized by IR and NMR. Crystal structures were obtained for cobalt and copper catalysts showing both metals as distinct complexes with two ligands.

Initial cyclic voltammetry measurements were made for both copper complexes and the cobalt complex.

Example 1

Catalysts with the molecular formula $M(DPK)_2(PF_6)_2$ were made where M is Cu and Co.

A 2:1 mole ratio of dipyridyl ketone ligand to the selected metal salt were added to water and stirred at room temperature overnight. The metal salts used were the chlorides.

A solution consisting of 0.5 mmol of DPK and 0.25 mmol of metal ion were reacted in 15 mL of distilled water with stirring at room temperature overnight. The catalyst was then isolated as the $PF_6$ salt by adding excess ammonium hexafluorophosphate to the same solution and then filtering. The powder was then rinsed with water and dried in a vacuum oven overnight.

X-ray quality crystals were obtained for Cu and Co catalysts through slow diffusion with DMSO and ether OR acetonitrile and hexanes.

Preferred metal salts are the metal halide salts; more preferably, $CuCl_2$, $CoCl_2$, $NiCl_2$, $MnCl_2$, $CuI_2$, $FeCl_2$, and $FeCl_3$.

Example 2

A series of 2,2'-dipyridyl ketone (DPK) containing metal complexes were synthesized with metals including Mn, Fe, Co, Ni, Cu, Ru, Pd, and Pt following the method from Example 1.

Example 3

In another embodiment, the mole ratio of the ligand and metal was changed to specifically make more clustered catalysts. One preferred catalyst comprises a 1:1 ligand to metal ratio.

The Copper(I) complex that was synthesized appears to be some alternate type of cluster based on solubility and crystallinity, this could not be confirmed with x-ray quality crystals.

Example 4

Another preferred embodiment accommodates the binding of 3 DPK ligands to the metal centers.

In other preferred embodiments the DPK ligands are modified. Preferred modifications are at the 4, 4'-positions or 3, 3' positions on the pyridine rings. These modifications are preferably a heteroatom containing group; such groups would enhance adherence or even possible chemical bonding to a donor substrate when used in a device. Examples of such modifications include, but are not limited to, a carboxylic acid, an amine, or a thiol; preferably with an intermediate carbon chain of C from 1 to 10.

Example 5

Bulk electrolysis was done with a catalyst from Example [Cu(II)DPK$_2$](PF$_6$)(Cl), in a solution of 0.1M TBAPF$_6$ in acetonitrile using a carbon foam working electrode, platinum counter electrode and Ag/AgNO$_3$ reference. The auxiliary electrode was isolated in a fitted glass chamber and a small amount of ferrocene was added to the solution in the chamber as a sacrificial donor to minimize side reactions. The samples were bubbled with $CO_2$ for 2 hours before the potential was applied and another CV run. At this point the −2V potential was applied for 3 hours. Over the course of the reaction the solution went from light blue to yellow.

GC-MS data was collected for the bulk material at the end of the run. Products of this electrolysis include both CO and triazine (2,4,6-trimethyl-1,3,5-triazine) and were, confirmed.

Example 6

The experiment from Example 5 was also run under the same conditions but with $N_2$ instead of $CO_2$ and no color change was observed, as well as an absence of any triazine. There were also other tests run as controls, without catalyst with $CO_2$ and $N_2$, and no color change or triazine was observed.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

What is claimed is:

1. A catalytic, solar fuel production method comprises reducing gaseous carbon dioxide from a gas source comprising exposing a carbon dioxide reduction catalyst to said source of gaseous carbon dioxide; said carbon dioxide reduction catalyst comprising a dipyridyl ketone coordination complex comprised of a transition metal and dipyridyl ketone.

2. The catalytic method of claim 1 wherein said solar fuel produced comprises fuel feedstocks, triazines, and various combinations thereof.

3. The catalytic method of claim 1 wherein said solar fuel produced comprises CO, $HCO_2H$, HCHO, $CH_3OH$, $CH_4$, 2,4,6-trimethyl-1,3,5-triazine, and various combinations thereof.

4. The catalytic method of claim 1 wherein said solar fuel produced comprises 2,4,6-trimethyl-1,3,5-triazine.

5. The method of claim 1 wherein said source of gaseous carbon dioxide is the atmosphere.

6. The method of claim 1 wherein said coordination complex comprises a discrete complex with a single transition metal center.

7. The method of claim 1 wherein the catalyst having the formula:

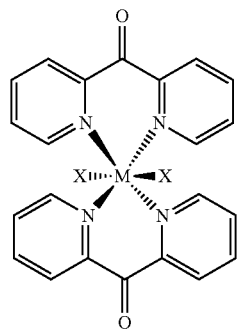

where M is a transition metal and X is a halogen.

8. The method of claim 1 wherein the catalyst having the formula:

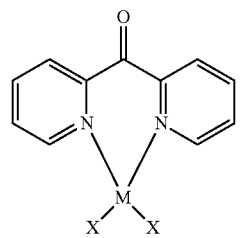

where M is a transition metal and X is a halogen.

9. The method of claim 1 wherein the catalyst having the formula:

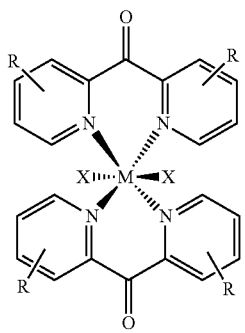

where M is a transition metal and X is a halogen; and, where R is a heteroatom containing group.

10. The method of claim 1 wherein the catalyst having the formula:

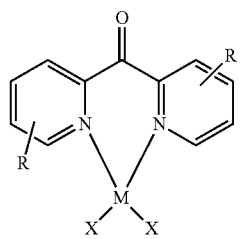

where M is a transition metal and X is a halogen; and, where R is a heteroatom containing group.

11. The method of claim 1 wherein the wherein said transition metal is selected from the group consisting of Mn, Fe, Go, Ni, Gu, Ru, Pd, and Pt.

* * * * *